(12) United States Patent
Ito et al.

(10) Patent No.: US 7,828,989 B2
(45) Date of Patent: Nov. 9, 2010

(54) HEAT TRANSFER MEDIUM COMPOSITION

(75) Inventors: Naoshi Ito, Gifu (JP); Kouhei Yoshimura, Gifu (JP)

(73) Assignee: Shishiai-Kabushikigaisha (JP)

( * ) Notice: Subject to any disclaimer, the term of this patent is extended or adjusted under 35 U.S.C. 154(b) by 466 days.

(21) Appl. No.: 11/807,542

(22) Filed: May 29, 2007

(65) Prior Publication Data

US 2009/0184284 A1    Jul. 23, 2009

Related U.S. Application Data

(63) Continuation-in-part of application No. PCT/JP2004/017584, filed on Nov. 26, 2004.

(51) Int. Cl.
C09K 5/00 (2006.01)
C09K 5/04 (2006.01)

(52) U.S. Cl. .............................. 252/71; 252/76; 252/79; 252/67; 252/68

(58) Field of Classification Search ................... 252/68, 252/73, 76, 79, 71, 67, 82, 147.18, 180, 369
See application file for complete search history.

(56) References Cited

U.S. PATENT DOCUMENTS

| | | | |
|---|---|---|---|
| 4,595,523 A * | 6/1986 | Knepper et al. | 252/390 |
| 4,851,145 A | 7/1989 | Van Neste et al. | |
| 4,959,523 A * | 9/1990 | Fihey et al. | 219/124.34 |
| 6,802,988 B1 * | 10/2004 | Wenderoth et al. | 252/73 |

FOREIGN PATENT DOCUMENTS

| | | |
|---|---|---|
| JP | 4-42477 B2 | 7/1992 |
| JP | 2001-519902 A | 10/2001 |
| JP | 2002-523619 A | 7/2002 |
| JP | 2003-514063 A | 4/2003 |
| JP | 2003-193042 A | 7/2003 |
| WO | WO 2006/057042 A1 | 6/2006 |

OTHER PUBLICATIONS

Shishiai-Kabushikikaisya, "Submission of Remarks/Experimental Data" with regard to PCT/JP2004/017584 and Regional/National Phase Applications Derived Therefrom.
Naoshi Ito, "Declaration" regarding PCT/JP2004/017584 dated Nov. 2, 2006.
International Search Report for International Application No. PCT/JP2004/017584 mailed Mar. 15, 2005.

* cited by examiner

*Primary Examiner*—Ling-Siu Choi
*Assistant Examiner*—Monique Peets
(74) *Attorney, Agent, or Firm*—Cantor Colburn LLP

(57) ABSTRACT

The present invention provides a pH stabilizing heat transfer medium composition comprising a main component of water, glycol, alcohol or glycol ether, and a pH buffer agent. The pH buffer agent is comprised of an alicyclic compound where a single ring-constituting carbon atom is bonded to two identical members or two different members selected from the group consisting of carboxymethyl and its salts, or where at least two ring-constituting neighboring carbon atoms are each bonded to a single member selected from the group consisting of carboxymethyl and its salts.

8 Claims, No Drawings

HEAT TRANSFER MEDIUM COMPOSITION

CROSS REFERENCE

This application is a continuation-in-part (CIP) of PCT/JP2004/017584 filed Nov. 26, 2004, priority to which is claimed herein under 35 U.S.C. §120 and 35 U.S.C. §365(c), and the entire disclosure of which is incorporated herein by reference.

TECHNICAL FIELD

The present invention relates to a heat transfer medium composition which is mainly used in cooling systems for internal combustion engines, solar systems, floor heating systems, air conditioners and the like. In particular, this invention relates to a heat transfer medium composition which keeps the range of change of the pH value minimal even after use over a long period of time.

BACKGROUND ART

A heat transfer medium composition which contains a glycol or an alcohol as its main component and a variety of corrosion inhibitors are mainly used in cooling systems for internal combustion engines, solar systems, floor heating systems, air conditioners and the like.

There exists a conventional heat transfer medium composition used in cooling systems for internal combustion engines which contains a glycol as its main component as well as an alkyl benzoate or its alkali metal salt, ammonium salt or amine salt, aliphatic monobasic acid of $C_8$ to $C_{12}$ or its alkali metal salt, ammonium salt or amine salt, and hydrocarbon triazole (Japanese Patent Publication H4 (1992)-42477).

However, glycols and alcohols which are used as a main component of such heat transfer medium compositions contact oxygen in use at a high temperature and high pressure, and are therefore oxidized, though lightly, and gradually converted into an acid such as glycolic acid.

Oxidation of these glycols and alcohols progresses as used continuously, and the pH value of the heat transfer medium gradually lowers from the originally set value of pH 6 to pH 10, progressively corroding the metal parts of cooling systems.

In addition, metals used in cooling systems, solar systems, floor heating systems or air conditioners such as aluminum, aluminum alloys, cast iron, steel, brass, solder and copper gradually dissolve into the heat transfer medium as metal ions. The eluted metal ions react with the corrosion inhibitor in the heat medium, forming precipitation. As a result, the remaining amount of the effective corrosion inhibitor in the heat medium is reduced, and the pH value of the heat medium is lowered below the effective working range, further inducing metal corrosion.

DISCLOSURE OF THE INVENTION

Problem to be Solved by the Invention

Accordingly, an object of the present invention is to provide a heat transfer medium composition whose change in pH value can be kept minimal even after long use.

Means to Solve the Problem

The heat transfer medium composition (hereinafter sometimes referred to as "the composition") according to the present invention is comprised of water, a glycol, an alcohol and/or a glycol ether as its main component and a pH buffer agent comprised of an alicyclic compound where a single ring-constituting carbon atom is bonded to two identical members or two different members selected from the group consisting of carboxymethyl and its salts, or where at least two ring-constituting neighboring carbon atoms are each bonded to a single member selected from the group consisting of carboxymethyl and its salts.

Effects of the Invention

The composition according to the present invention contains a pH buffer agent comprised of an alicyclic compound where a single ring-constituting carbon atom is bonded to two identical members or two different members selected from the group consisting of carboxymethyl and its salts, or where at least two ring-constituting neighboring carbon atoms are each bonded to a single member selected from the group consisting of carboxymethyl and its salts, which holds change in pH value minimal even after long use, and as a result corrosion hardly occurs on the metal parts of cooling systems.

BEST MODE FOR CARRYING OUT THE INVENTION

The composition according to the present invention is comprised of water, a glycol, an alcohol and/or a glycol ether as its main component. The glycol that may be used in the composition according to the present invention may be at least one selected from among ethylene glycol, diethylene glycol, triethylene glycol, propylene glycol, 1,3-propanediol, 1,3-butanediol, 1,5-pentanediol and hexylene glycol.

The alcohol that may be used may be at least one selected from among methanol, ethanol, propanol, butanol, pentanol, hexanol, heptanol and octanol.

The glycol ether that may be used may be selected from among ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether and tetraethylene glycol monobutyl ether.

The heat transfer medium composition contains a pH buffer agent prepared of an alicyclic compound where a single ring-constituting carbon atom is bonded to two identical members or two different members selected from the group consisting of carboxymethyl and its salts, or where at least two ring-constituting neighboring carbon atoms are each bonded to a single member selected from the group consisting of carboxymethyl and its salts.

The pH buffer agent effectively prevents the pH value of the heat transfer medium from going out of the appropriate use range of pH 6 to pH 10 which is initially adjusted with a pH adjuster such as potassium hydroxide so as to prevent oxidation of the glycol and to prevent metal ions from eluting out of metal portions of a cooling system, solar system, floor heating system, air conditioner or the like.

The alicyclic compound which may be used as the pH buffer agent typically has a structure where carbon atoms are bonded in rings and do not have aromatic properties. The alicyclic compound that is used for the pH buffer agent of the present invention is a compound such as cycloalkane, cycloalkene or cycloalkyne where a single ring-constituting carbon atom is bonded to two identical members or two different members selected from the group consisting of carboxymethyl and its alkali metal salts (sodium salt, potassium salt and the like), ammonium salts and amine salts.

Among such alicyclic compounds, compounds having a ring consisting of 5 to 7 carbons are preferred as they provide excellent buffer performance. Examples of alicyclic compounds having a ring consisting of 5 to 7 carbons are 1,1-cyclopentane diacetic acid, 3-methyl-1,1-cyclopentane diacetic acid, 1,1-cyclohexane diacetic acid, 1,2-cyclohexane diacetic acid, 3-methyl-1,1-cyclohexane diacetic acid, 4-methyl-1,1-cyclohexane diacetic acid, 4-carboxyl-1,1-cyclohexane diacetic acid, 1,1-cycloheptane diacetic acid and their salts.

Among such alicyclic compounds having a ring consisting of 5 to 7 carbons, 1,1-cyclopentane diacetic acid and 1,1-cyclohexane diacetic acid are preferred in consideration of their availability and low price.

The pH buffer agent is contained in the composition from 0.01 mass % to 10 mass % before dilution with water to provide effective buffer. If the content of the pH buffer agent is less than 0.01 mass %, buffer performance of the heat transfer medium is poor, while if the content of the pH buffer agent exceeds 10 mass %, it is only uneconomical.

The composition according to the present invention may include at least one corrosion inhibitor in addition to the pH buffer agent. Examples of corrosion inhibitors which are appropriately included in the composition are phosphoric acid and its salts, aliphatic carboxylic acid and its salts, aromatic carboxylic acid and its salts, triazoles, thiazoles, silicates, nitrates, nitrites, borates, molybdates and amines.

Orthophosphoric acid, pyrophosphoric acid, hexamethylphosphoric acid, tripolyphosphoric acid and their alkali metal salts, sodium salts and potassium salts may be preferred among such phosphoric acid and its salts.

Pentanoic acid, hexanoic acid, heptanoic acid, octanoic acid, nonanoic acid, decanoic acid, 2-ethyl hexanoic acid, adipic acid, suberic acid, azelaic acid, sebacic acid, undecanoic acid, dodecanoic diacid and its alkali metal salts, sodium salts and potassium salts may be preferred among such aliphatic carboxylic acid and its salts.

Benzoic acid, toluic acid, paratertiary butyl benzoic acid, phthalic acid, paramethoxy benzoic acid, cinnamic acid and its alkali metal salts, sodium salts and potassium salts may be preferred among such aromatic carboxylic acid and its salts.

Benzotriazole, methylbenzotriazole, cyclobenzotriazole and 4-phenyl-1,2,3-triazole may be preferred among such triazoles.

Mercaptobenzothiazole and its alkali metal salts, sodium salt and potassium salt may be preferred among such thiazoles.

Sodium metasilicate and potassium metasilicate as well as solutions of sodium silicate, which is also called "water glass" and represented by $Na_2O/XSiO_2$ (X is 0.5 to 3.3), may be preferred among such silicates. Sodium nitrate and potassium nitrate may be preferred among such nitrates, and sodium nitrite and potassium nitrite may be preferred among such nitrites. Sodium tetraborate and potassium tetraborate may be preferred among such borates.

Sodium molybdate, potassium molybdate and ammonium molybdate may be preferred among such molybdates, and monoethanolamine, diethanolamine, triethanolamine, monoisopropanolamine, diisopropanolamine and triisopropanolamine may be preferred among such amines.

Various metals such as aluminum, aluminum alloys, cast iron, steel, brass, solder and copper are used in cooling systems of internal combustion engines, solar systems, floor heating systems and air conditioners. Therefore, it is desirable to use a combination of the above described corrosion inhibitors in order to effectively suppress corrosion of such metals.

A pH adjustor such as sodium hydroxide or potassium hydroxide, an anti-foaming agent and a coloring agent may be appropriately added to the above described composition of the present invention.

Embodiments

In the following, preferred embodiments of the composition according to the present invention are described as compared with comparatives, where the performance (buffer performance) of the composition of the present invention is clearly shown. Embodiments 1 to 3 and Comparatives 1 to 3 shown in Table 1 were prepared by dilution to a concentration of 30 vol. % with pure water and samples of 100 ml were prepared for the buffer performance test.

Embodiments 1 to 3 shown in Table 1 were compositions according to the present invention. Embodiment 1 consisted of water and ethylene glycol as its main component. As the pH buffer agent, 1,1-cyclohexane diacetic acid where two carboxymethyl groups are bonded to one ring-constituting atom was added, the pH being adjusted with potassium hydroxide to the initial pH value 10. Embodiment 2 consisted the same as Embodiment 1, except that 1,2-cyclohexane diacetic acid where one carboxylmethyl is bonded to each of two ring-constituting neighboring atoms was added as the pH buffer agent. Embodiment 3 consisted the same as Embodiment 1, except that a corrosion inhibitor was added.

Comparatives 1 to 3 shown in Table 1 consisted of water and ethylene glycol as their main components, which were the same as Embodiments 1 to 3. Cyclohexane acetic acid where one carboxymethyl group is bonded to an alicyclic hydrocarbon was added to prepare Comparative 1. 1,2-phenylene diacetic acid where a carboxymethyl group is bonded to each of two aromatic ring-constituting neighboring atoms was added to prepare Comparative 2. A corrosion inhibitor was further added to the composition identical with Comparative 1 to prepare Comparative 3. Comparatives 1 to 3 were also adjusted with potassium hydroxide in the same manner as for Embodiments 1 to 3 such that their initial pH values were pH 10.

The amount of 1/10 normal hydrochloric acid (ml) required to change the pH value of Embodiments 1 and 2 and Comparatives 1 and 2 from the initial pH value of pH 10 to pH 6 was measured and evaluated. It was determined that buffer effect was superior when a "large" amount of hydrochloric acid was required and buffer effect was poor when a "small" amount of hydrochloric acid was required for the purpose. The results are shown in Table 2.

TABLE 1

| Component | Embodiment | | | Comparative | | |
| --- | --- | --- | --- | --- | --- | --- |
| | 1 | 2 | 3 | 1 | 2 | 3 |
| Ethylene glycol | Rest | ← | ← | ← | ← | ← |
| Potassium hydroxide | Appropriate amount | ← | ← | ← | ← | ← |
| Water | 2 | 2 | 2 | 2 | 2 | 2 |
| 1,1-cyclohexane diacetic acid | 1 | — | 1 | — | — | — |
| 1,2-cyclohexane diacetic acid | — | 1 | — | — | — | — |
| Cyclohexane acetic acid | — | — | — | 1 | — | — |
| 1,2-phenylene | — | — | — | — | 1 | 1 |

TABLE 1-continued

| Component | Embodiment | | | Comparative | | |
|---|---|---|---|---|---|---|
| | 1 | 2 | 3 | 1 | 2 | 3 |
| diacetic acid p-tert-butyl benzoic acid | — | — | 3 | — | — | 3 |
| Sebacic acid | — | — | 1 | — | — | 1 |
| Sodium molybdate | — | — | 0.3 | — | — | 0.3 |
| Sodium nitrate | — | — | 0.3 | — | — | 0.3 |
| Phosphoric acid | — | — | 0.3 | — | — | 0.3 |
| Total | 100 | 100 | 100 | 100 | 100 | 100 |
| Initial pH value | 10 | 10 | 10 | 10 | 10 | 10 |

TABLE 2

| Item | Embodiment 1 | Embodiment 2 | Comparative 1 | Comparative 2 |
|---|---|---|---|---|
| Amount of 1/10 normal hydrochloric acid (ml) pH 10 → 6 | 16.4 | 8.6 | 3.7 | 5.5 |

Table 2 shows that the amounts of hydrochloric acid for Embodiments 1 and 2 are 16.4 ml and 8.6 ml respectively, which are considered "large" compared with 3.7 ml and 5.5 ml respectively for Comparatives 1 and 2. Therefore, Embodiments 1 and 2 are found excellent in buffer performance.

Embodiments 1 and 2 produced no precipitation of the pH buffer agent in the actual use range pH 6 to pH 10, and they are found excellent in providing stability.

Embodiment 3 and Comparative 3 were diluted to the concentration of 30 vol. % with pure water (the initial pH value: pH 8) as Table 1 shows, which were held for 672 hours at 120° C. After cooling, their pH values were measured and the changes from their original pH values were taken. The results are shown in Table 3.

TABLE 3

| Item | Embodiment 3 | Comparative 3 |
|---|---|---|
| pH value before test | 8.0 | 8.0 |
| pH value after test | 7.1 | 6.6 |
| pH change | −0.9 | −1.4 |

Table 3 shows that Comparative 3 lowered its pH value by 1.4, while Embodiment 3 lowered its pH value by only 0.9.

INDUSTRIAL APPLICABILITY

The heat transfer medium composition according to the present invention changes the pH value only minimally even after long use, and therefore is considered useful in cooling systems for internal combustion engines, solar systems, floor heating systems, air conditioners and the like.

The invention claimed is:

1. A heat transfer medium composition comprising a main component comprised of at least one member selected from the group consisting of water, glycols, alcohols and glycol ethers, and a pH buffer agent comprised of an alicyclic compound where a single ring-constituting carbon atom is bonded to two identical members or two different members selected from the group consisting of carboxymethyl and its salts, or where at least two ring-constituting neighboring carbon atoms are each bonded to a single member selected from the group consisting of carboxymethyl and its salts.

2. The heat transfer medium composition according to claim 1, wherein the pH buffer agent is comprised of an alicyclic compound having a ring consisting of 5 to 7 carbon atoms.

3. The heat transfer medium composition according to claim 2, wherein the pH buffer agent is comprised of an alicyclic compound having a ring consisting of 5 to 7 carbon atoms one of which is bonded to two identical members or two different members selected from the group consisting of carboxymethyl and its salts, said alicyclic compound being selected from the group consisting of 1,1-cyclopentane diacetic acid, 3-methyl-1,1-cyclopentane diacetic acid, 1,1-cyclohexane diacetic acid, 1,2-cyclohexane diacetic acid, 3-methyl-1,1-cyclohexane diacetic acid, 4-methyl-1,1-cyclohexane diacetic acid, 4-carboxy-1,1-cyclohexane diacetic acid, 1,1-cycloheptane diacetic acid and their salts.

4. The heat transfer medium composition according to claim 1, wherein the content of the pH buffer agent is 0.01 mass % to 10 mass %.

5. The heat transfer medium composition according to claim 1, further comprising at least one corrosion inhibitor.

6. The heat transfer medium composition according to claim 2, further comprising at least one corrosion inhibitor.

7. The heat transfer medium composition according to claim 3, further comprising at least one corrosion inhibitor.

8. The heat transfer medium composition according to claim 4, further comprising at least one corrosion inhibitor.

* * * * *